United States Patent [19]

Fleury

[11] 4,391,027

[45] Jul. 5, 1983

[54] METHOD OF MAKING A HEAT EXCHANGER ASSEMBLY

[75] Inventor: James C. Fleury, Ora, Ind.

[73] Assignee: Ex-Cell-O Corporation, Troy, Mich.

[21] Appl. No.: 270,602

[22] Filed: Jun. 5, 1981

Related U.S. Application Data

[62] Division of Ser. No. 104,588, Dec. 17, 1979, Pat. No. 4,296,805.

[51] Int. Cl.³ ............................................. B23P 15/26
[52] U.S. Cl. .............................. 29/157.3 B; 29/157.4; 29/418; 29/726; 228/183
[58] Field of Search ................... 29/157.3 B, 157.3 C, 29/157.3 R, 157.4, 33 G, 726, 418, 411; 165/51, 148, 149, 151–153, 172, 173, 175, DIG. 13; 228/183

[56] References Cited

U.S. PATENT DOCUMENTS

| | | | |
|---|---|---|---|
| 1,109,384 | 9/1914 | Alexander | 29/157.4 |
| 1,664,812 | 4/1928 | Gargiulo et al. | 165/149 |
| 1,836,619 | 12/1931 | Ritter | 29/157.3 B |
| 1,877,325 | 9/1932 | Ihde | 165/153 |
| 2,686,957 | 8/1954 | Koerper | 29/157.3 A |
| 3,086,283 | 4/1963 | Webber et al. | 29/157.3 R |
| 3,237,688 | 3/1966 | Huggins | 29/157.3 B |
| 3,472,316 | 10/1969 | Couch, Jr. | 29/157.4 |
| 3,807,024 | 4/1974 | Harvey et al. | 29/157.4 |
| 3,941,293 | 3/1976 | Chartet | 29/157.3 B |
| 3,981,354 | 9/1976 | Haberski | 29/157.4 |
| 3,993,125 | 11/1976 | Rhodes | 29/157.3 B |
| 4,187,901 | 2/1980 | Coleman et al. | 165/47 |
| 4,234,041 | 11/1980 | Melnyk | 29/157.4 |
| 4,303,122 | 12/1981 | Powell | 29/157.3 R |

FOREIGN PATENT DOCUMENTS

| | | | |
|---|---|---|---|
| 45-39457 | 12/1970 | Japan | 29/157.3 A |
| 1525761 | 9/1978 | United Kingdom | 29/157.3 A |

Primary Examiner—Daniel C. Crane
Attorney, Agent, or Firm—John P. Moran

[57] ABSTRACT

A heat exchanger assembly such as a radiator, or the like, comprising a core having front and rear faces and including tubes parallel to the faces and spaced fins extending transversely to the faces and the tubes respectively and interconnecting the tubes by being soldered thereto. The core has an opening therein defined by a group of the tubes being devoid of a length thereof so as to have spaced first and second open ends. A single tank is in fluid communication with the first and second ends to establish fluid communication therebetween. The tank has front and rear walls disposed adjacent the front and rear faces of the core and a peripheral wall extending about the opening and interconnecting the front and rear walls to define an enclosed volume within the tank. A tubular member extends through the volume between the front and rear walls and in spaced relationship to the peripheral wall for defining a clearance hole allowing access through the core between the opposite faces. The assembly may include sheet-like fins or serpentine fins and a method for making all embodiments is disclosed.

10 Claims, 9 Drawing Figures

METHOD OF MAKING A HEAT EXCHANGER ASSEMBLY

This is a division of application Ser. No. 104,588 filed Dec. 17, 1979 now U.S. Pat. No. 4,296,805, issued Oct. 27, 1981.

BACKGROUND OF THE INVENTION (1) Field of the Invention

This invention relates to a heat exchanger and the method for making a heat exchanger of the type having a core with front and rear faces and a plurality of tubes parallel to the faces and a plurality of heat exchange fins extending transversely to the faces and the tubes respectively and interconnecting the tubes. There is often a requirement that there be access through the heat exchanger core from one face to the other. Typical of such a requirement are radiators for cooling engines in industrial and agricultural vehicles. It is frequently necessary to provide an access hole through the radiator in such a vehicle to provide access to the rotating engine crankshaft or power takeoff for extracting engine power through the access hole in the radiator to drive various axiliary devices or machines.

(2) Description of the Prior Art

Such power takeoff or accessory holes have been provided in radiators by placing a hole through the radiator core by removing a portion of the fins and lengths of the tubes with the downwardly facing openings in the tubes in fluid communication with a small tank and the upwardly facing ends of the tubes in fluid communication with a second small tank. The two small tanks are interconnected by tubes or passages disposed near the sides of the opening.

The problem with such assemblies are that there is not sufficient room for all of the tubes adjacent the sides of the opening to be in fluid communication with the respective upper and lower tanks and therefore these tubes are sealed off and are not effective for cooling. Additionally, the flow from the upper tank to the lower tank is somewhat restricted. Further, the construction requires a relatively large number of parts and incurs high labor expenses in fabrication.

SUMMARY OF THE INVENTION

A heat exchanger assembly such as a radiator, or the like, comprising a core having front and rear faces and including tubes parallel to the faces and fins extending transversely to the faces and the tubes respectively and interconnecting the tubes. The core has an opening therein defined by a group of the tubes being devoid of a length thereof so as to have spaced first and second open ends. A single tank is in fluid communication with the first and second ends to establish fluid communication therebetween. The tank has front and rear walls disposed adjacent the front and rear faces of the core and a peripheral wall extending about the opening and interconnecting the front and rear walls to define an enclosed volume within the tank. A tubular member extends through the volume between the front and rear walls and in spaced relationship to the peripheral wall for defining a clearance hole allowing access through the core between the opposite faces.

The assembly is made by assembling the fins and tubes together and with the peripheral wall extending between the front and rear faces to define oppositely facing openings adjacent the faces and including perforated top and bottom walls interconnected by side walls with a first group of tubes inserted into the perforations with each devoid of a length thereof between the top and bottom walls and closing the oppositely facing openings of the peripheral wall with closure members.

Other advantages of the present invention will be readily appreciated as the same becomes better understood by reference to the following detailed description when considered in connection with the accompanying drawings wherein:

DESCRIPTION OF THE INVENTION

Figure 1:
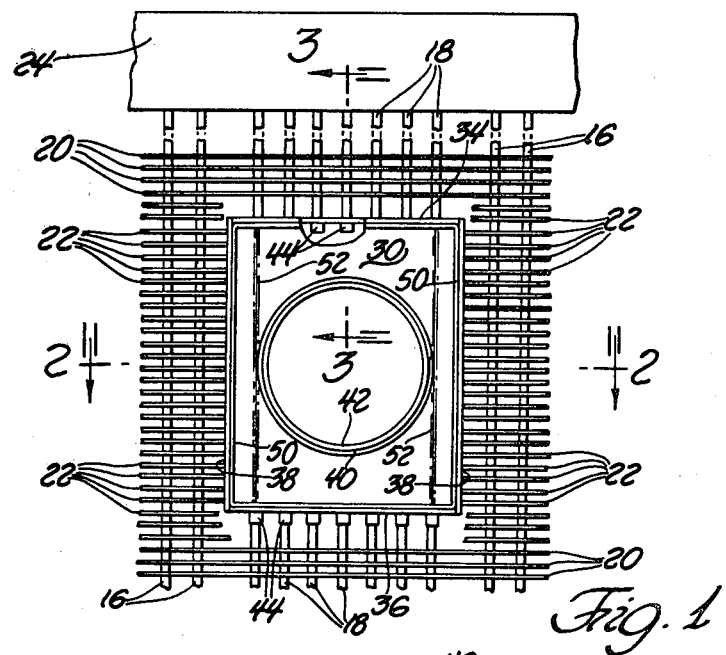
FIG. 1 represents a front elevational view partially broken away of a heat exchanger constructed in accordance with the subject invention.
Figure 2:
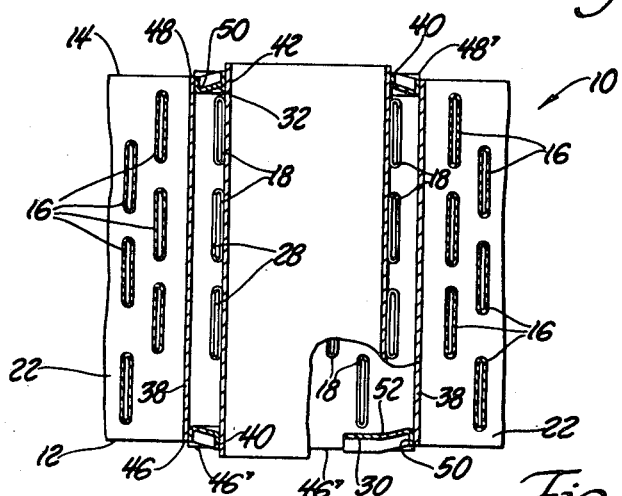
FIG. 2 is a fragmentary cross-sectional view taken substantially along line 2—2 of FIG. 1 and partially broken away.
Figure 3:
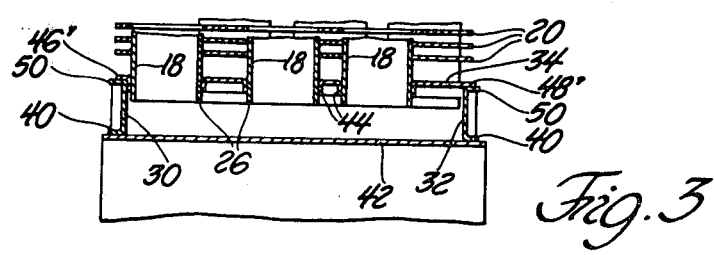
FIG. 3 is a fragmentary cross-sectional view taken substantially along line 3—3 of FIG. 1.

A heat exchanger assembly constructed in accordance with the subject invention is generally shown at 10 in FIGS. 1 through 3. The heat exchanger 10 includes a core having front and rear faces 12 and 14 respectively. The core has a plurality or groups of tubes 16 and 18 disposed parallel to the faces 12 and 14. The assembly also includes a plurality of spaced thin sheet-like heat exchange fins 20 and 22 extending transversely or perpendicularly to the faces 12 and 14 and transversely or perpendicularly to the tubes 16 and 18. The fins 20 and 22 interconnect the tubes 16 and 18. As illustrated, the tubes 16 and 18 are elongated or generally oval in cross section and the fins 20 and 22 have apertures or holes therein for closely surrounding the tubes 16 and 18, the tubes being preferably soldered to the fins 20 and 22 in a well known fashion.

The tubes 16 and 18 extend between and are in fluid communication with an upper tank 24 and a lower tank, not shown. Further, the assembly 10 would normally include a support casing or frame surrounding its periphery in the well known manner.

A group 18 of the tubes and a first plurality 22 of the fins define an opening extending between the faces 12 and 14 along the lengths thereof between opposite ends of the tubes 16 and 18 and between opposite ends of the fins 20 and 22. In other words, the opening is located within the periphery of the core. The opening is defined by each of the tubes in the group 18 being devoid of a length thereof so each of the tubes 18 in the group has spaced first and second open ends 26 and 28 respectively, the open ends 26 being at the top of the opening facing downwardly with the second open ends 28 being at the bottom of the opening and facing upwardly. The opening is also defined by each of the fins of the plurality 22 being devoid of a length thereof so each fin 22 has laterally spaced ends on either side of the opening.

A single tank is in fluid communication with the first and second open ends 26 and 28 of the tubes 18 to establish fluid communication therebetween. Specifically, the tank has front and rear walls defined by the front and rear closure members 30 and 32 disposed adjacent the front and rear faces 12 and 14 respectively of the core. The tank also includes a peripheral wall having top and bottom walls 34 and 36 and side walls 38. The peripheral wall defines a rectangle having top and bottom walls 34 and 36 parallel and spaced from one another with the side walls 38 being parallel and spaced from one another and perpendicular to the top and bottom walls 34 and 36 respectively. The top and bottom walls 34 and 36 are shorter in length than the side walls 38. The peripheral wall defined by the top and bottom walls 34 and 36 and side walls 38 extends about the opening and interconnects the front and rear closure members 30 and 32 to define an enclosed volume within the tank. The closure members 30 and 32 each have a circular tubular opening defined by the flanges 40 with the opening defined by the flanges 40 being spaced from the peripheral wall, i.e., the top and bottom walls 34 and 36 and the side walls 38. A circular tubular member 42 extends through the enclosed volume of the tank between the front and rear closure members 30 and 32 and in spaced relationship to the walls 34, 36 and 38 for defining a clearance hole allowing access through the core between the opposite faces 12 and 14 thereof.

The top and bottom walls 34 and 36 include a plurality of ferrules 44 integral therewith with each ferrule 44 extending from the top and bottom walls 34 and 36 respectively and surrounding and in sealing engagement with the respective first and second open ends 26 and 28 of said group of tubes 18. The ferrules 44 extend from the top and bottom walls 34 and 36 respectively in the same direction, i.e., downwardly. The tubes 18 are soldered to the ferrules 44 so that the top wall 34 is sealed to the first ends 26 of the tubes 18 and the bottom wall 36 is sealed to the second ends 28 of the tubes 18.

The top and bottom walls 34 and 36 and side walls 38 of the integral peripheral wall define front and rear edges 46 and 48 and the closure members 30 and 32 are disposed in sealing relationship with the front and rear edges 46 and 48 respectively by being soldered thereto. More specifically, the closure members 30 and 32 include flanges 50 about the periphery thereof, the flanges 50 being sealingly secured within the peripheral wall adjacent the edges 46 and 48 thereof by being soldered thereto.

The tube flange 40 extends about and is sealingly secured to the exterior of the tubular member 42 by being soldered thereto. Although the flange 40 and the tubular member are illustrated as being circular, it will be appreciated that the cross section may be of other configurations. Further, the ends of the tubular member 42 extend outwardly of the outward extremities of the peripheral wall and the closure members 30 and 32, as best illustrated in FIGS. 2 and 3. This provides some protection to the radiator core and the fins when inserting a tool or implement through the tubular member 42.

Further, the front and rear edges 46' and 48' of the top and bottom walls 34 and 36 respectively extend outwardly or farther than the front and rear edges 46 and 48 of the side walls 38. The closure members 30 and 32 are identical and formed of a stamping, preferably brass. The flanges 50 along the sides of the closure members 30 and 32 are recessed rearwardly of the flanges 50 running along the top and bottom edge and therefore there is a crease or bend line 52 extending vertically in each closure member.

As will be appreciated, liquid will flow between the upper tank 24 and a similarly disposed lower tank through the tubes 18 and through the volume within the single tank defined by the walls 34, 36, 38 and the closure members 30 and 32 and about the tubular member 42 while at the same time access may be had through the heat exchanger by passing instruments or tools through the tubular member 42.

Figure 6:
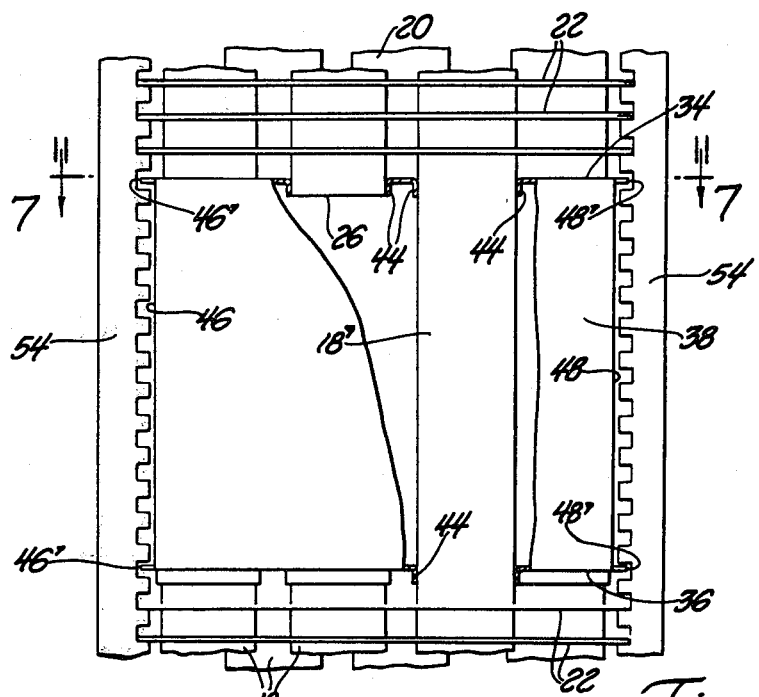
FIG. 6 is a side elevational view partially broken away and in cross section showing the method by which the heat exchange assembly of FIGS. 1 through 5 is made.
Figure 7:
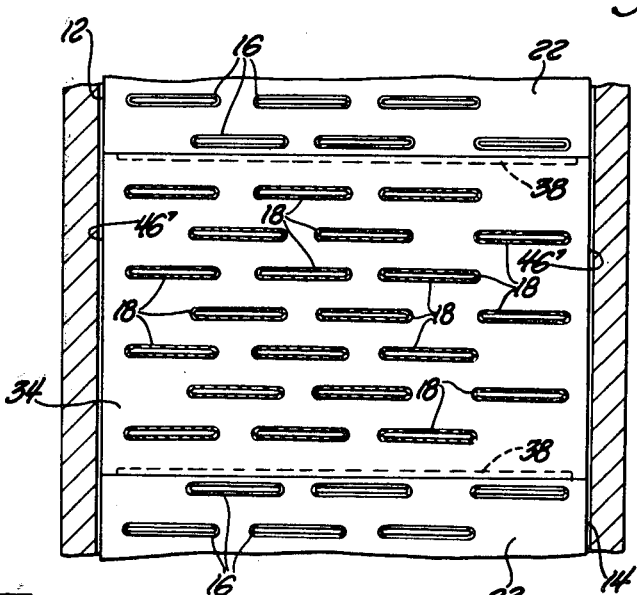
FIG. 7 is a cross-sectional view taken substantially along line 7—7 of FIG. 6.

The assembly 10 of FIGS. 1 through 3 is made as illustrated in FIGS. 6 and 7 by disposing a pair of fin nesting members 54 a distance apart which is approximately the distance between the front and rear faces 12 and 14 of the core. The fin nesting members 54 include a plurality of notches for supporting the fins 20 and 22. As best illustrated in FIG. 6, a peripheral wall defined by the enclosure member having the top and bottom walls 34 and 36 and side walls 38 between the fin nesting members 54 to be supported thereby as the outwardly extending edges 46' and 48' of the top and bottom walls 34 and 36 respectively are disposed within notches in the fin nesting members 54. The peripheral wall defined by the top and bottom walls 34 and 36 and side walls 38 define oppositely facing openings defined by the edges 46' and 48' facing the respective fin nesting members 54.

Perforated fins are positioned in parallel spaced relationship between the nesting members 54 with a first plurality of fins 20 extending between the nesting members 54 and across the top and bottom walls 34 and 36 and laterally of the side walls 38 and with a second plurality of fins 22 extending between the nesting members 54 in perpendicular relationship to and laterally of the side walls 38 with the ends of the second plurality of fins 22 disposed adjacent or in abutting relationship with the side walls 38.

A first group of parallel and spaced tubes 18 are inserted through the perforations in the first plurality of fins 20 between the side walls 38 and through the perforations defined by the ferrules 44 in the top and bottom walls 34 and 36 so that the tubes 18 extend between the top and bottom walls 34 and 36 as illustrated by the tube 18' in FIG. 6. A second group of tubes 16 are inserted in parallel and spaced relationship through the perforations in the first and second plurality of fins 20 and 22 laterally of the side walls 38 and parallel thereto.

After all the tubes have been inserted the assembly may be removed from the fin nesting members 54 and the lengths 18', as illustrated in FIG. 6, of the tubes 18 may be removed as by cutting or severing to define the first and second open ends 26 and 28 respectively. After the assembly has been removed, the tubes 16 and 18 may be soldered to the fins 20 and 22 and to the ferrules 44.

Thereafter, the oppositely facing openings defined by the edges 46, 46', 48 and 48' of the peripheral wall may be closed with the closure members 30 and 32 by being inserted into position and having the flanges 50 thereof soldered to the inside periphery of the peripheral wall defined by the top and bottom walls 34 and 36 and side walls 38. The tubular member 42 is inserted into the tubular openings defined by the flanges 40 to extend between the closure members 30 and 32 for allowing access through the core between the opposite faces thereof as the tube 42 is soldered to the flanges 40. Thus, the tubes 18 are sealed to the perforations defined by the ferrules 44 in the top and bottom walls 34 and 36 and the closure members 30 and 32 seal the top and bottom and side walls 34, 36 and 38 while the tubular member 42 is sealed to the closure members 30 and 32, all of the members preferably being soldered together.

It will be appreciated that the steps in fabricating the assembly 10 may be performed in various different orders.

Figure 4:
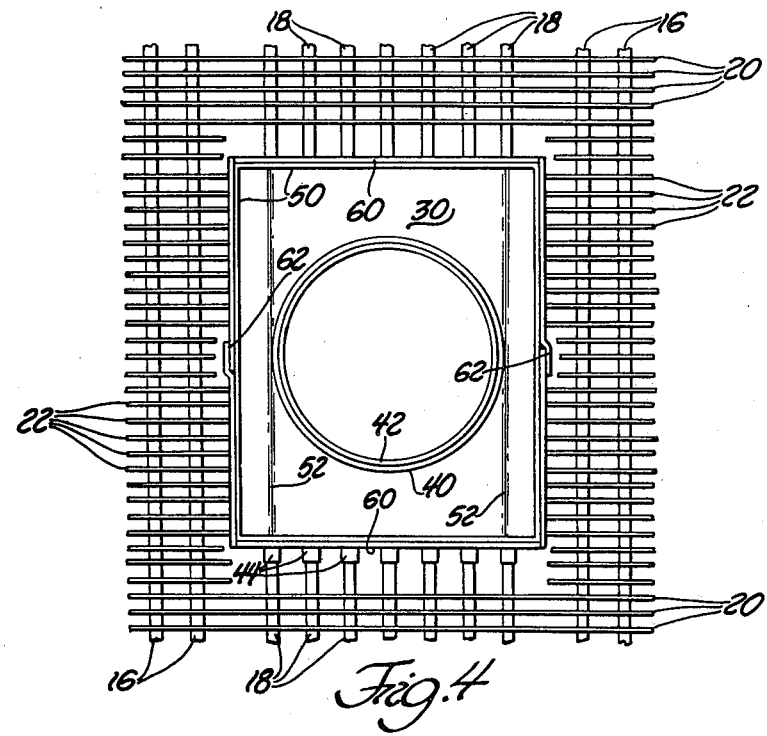
FIG. 4 is a front elevational view similar to FIG. 1 but in larger scale and showing an alternative embodiment.

The embodiment in FIG. 4 differs from the embodiment of FIGS. 1 through 3 only in that the outer peripheral wall, instead of being defined by an integral continuous tubular member as illustrated in FIG. 1, is made of two identical halves 60 having overlapping joints 62 which are soldered together.

Figure 5:
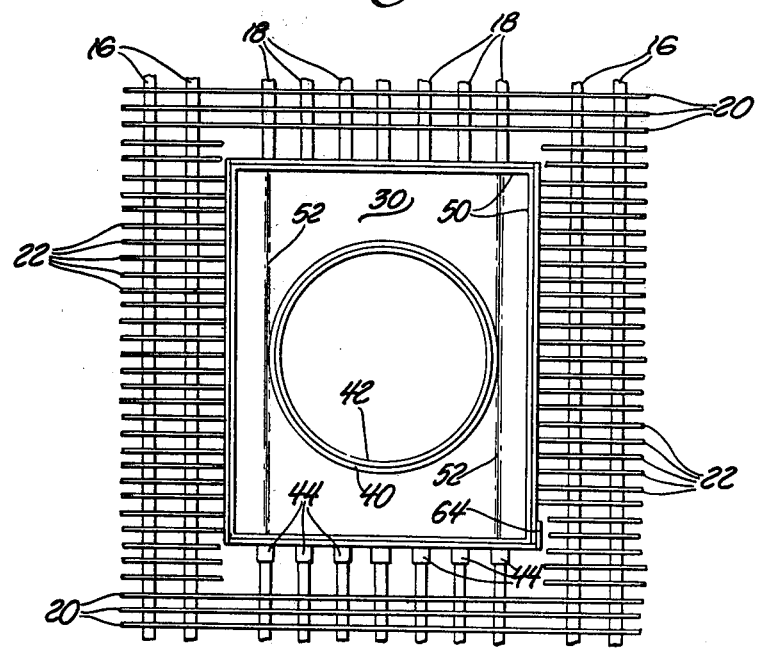
FIG. 5 is a view similar to FIG. 4 but showing another alternative embodiment.

The embodiment of FIG. 5 is identical to the previous embodiments except the peripheral wall is defined by a sheet bent into the rectangular configuration and having an overlapping joint 64 soldered together to define the top and bottom and side walls.

In addition to soldering, the joint 62 of FIG. 4 and the joints 64 of FIG. 5 may be sealed by resistance welding, or the like.

Figure 8:
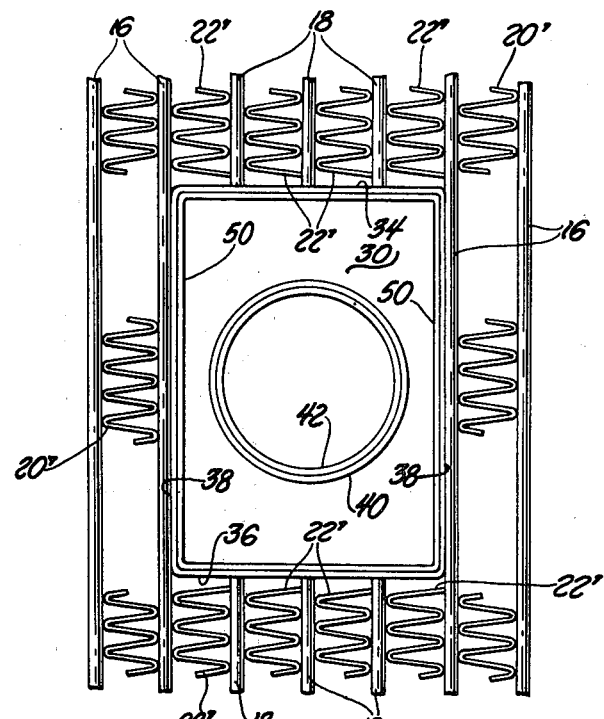
FIG. 8 is a front elevational view showing an alternative embodiment utilizing serpentine fins.

The embodiment of FIG. 8 differs from the embodiment of FIGS. 1 through 3 only in that the heat exchange fins 20' and 22' are serpentine instead of the sheet fins 20 and 22. In the embodiment of FIG. 8, the core includes the tubes 16 and 18 disposed parallel to the front and rear faces. The fins 20' and 22' extend transversely or perpendicularly to the front and rear faces and transversely or perpendicularly to the tubes 16 and 18. The fins 20' and 22' are serpentine as each fin is defined by a continuous series of reverse bends so that each fin extends back and forth between adjacent tubes and the opposite U-shaped bends of each fin are soldered to the adjacent tubes. Like in the previous ebodiments, a group 18 of the tubes and a plurality 22' of the fins define an opening extending between the front and rear faces along the lengths thereof between opposite ends of the tubes 16 and 18 and between opposite ends of the fins 20' and 22'. The opening is defined by each of the tubes in the group 18 being devoid of a length thereof and by each of the serpentine fins 22' of the plurality being devoid of a length thereof so each fin 22' has vertically spaced ends on the top and bottom of the opening.

Although in some instances, at least one row of tubes may be eliminated on each side of the tank as in prior assemblies, the invention is particularly advantageous because the size of the tank may be selected so that no tubes need be eliminated, as all rows of tubes will be equally spaced, as clearly shown in FIG. 8.

Figure 9:
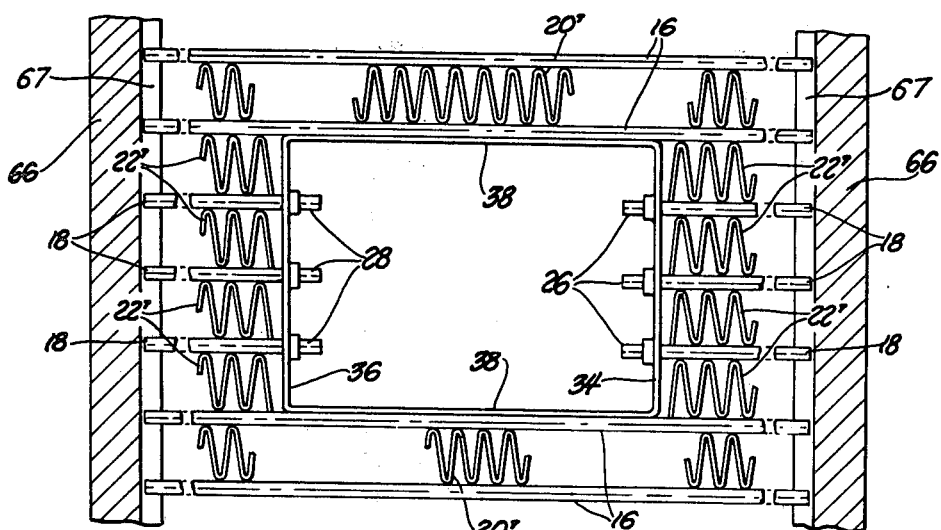
FIG. 9 is a front elevational view showing the method by which the heat exchange assembly of FIG. 8 is made.

The heat exchanger assembly of FIG. 8 is made as illustrated in FIG. 9 by disposing tube nesting members 66 a distance apart approximately the distance between the top and bottom of the core. Vertically spaced rows of the tubes 16 and 18 are disposed between the tube nesting members 66. The tube nesting members 66 have vertically extending notches 67 therein so that a plurality of tubes may be disposed in each of the notches whereby each row of tubes extends between the front and rear faces of the core. Lengths of serpentine fins 20' and 22' are disposed to extend between the two nesting members 66 so as to engage the adjacent vertically spaced rows of tubes 16 and 18. In practice, a row of tubes are disposed in the vertical notches 67 and thereafter a serpentine fin is disposed over a row of tubes and another row of tubes are inserted into the vertical notches 67 followed by another serpentine fin, and so on. The peripheral wall including the top and bottom walls 34 and 36 and the side walls 38 is disposed at a position between the nesting members 66 with the first group of tubes 18 disposed to extend between each nesting member 66 and the perforations in one of the top and bottom walls 34 and 36. The first group of tubes 18 terminate within the top and bottom walls 34 and 36 respectively adjacent the perforations therein so that the peripheral wall is devoid of tubes between the top and bottom walls 34 and 36 thereof.

An alternative method of assembling the heat exchanger assembly of FIG. 8 is to utilize tube nesting members, like 66, but with horizontally extending notches therein for receiving the vertically spaced rows of tubes. Additionally, instead of notches in the tube nesting members, spacers may be utilized to separate the tubes. Such spacers may be utilized to separate the tubes both horizontally and vertically. Also, a combination of notches and spacers may be utilized.

The heat exchanger assembly of the subject invention has a core with front and rear faces and a plurality of tubes parallel to the faces and a plurality of fins extending transversely to the faces and tubes respectively and interconnecting the tubes and may be made by assembling the fins 20, 22, 20' and 22' and the tubes 16 and 18 together with a peripheral wall extending between the front and rear faces to define oppositely facing openings adjacent the faces and including perforated top and bottom walls 34 and 36 interconnected by side walls 38 with a first group of tubes 18 inserted into the perforations with each tube 18 devoid of a length thereof between the top and bottom walls 34 and 36 and thereafter closing the oppositely facing openings of the peripheral wall with the closure members 30 and 32. Preferably, the tubular opening defined by the flange 40 in each of the closure members 30 and 32 is formed before the closing member is positioned to close the oppositely facing openings in the peripheral wall. The tubular member 42 is inserted into the tubular openings defined by the flanges 40 to extend between the closure members 30 and 32 for allowing access through the core between the opposite faces thereof.

In accordance with the usual custom, the tubes of the core are pre-coated with solder and the entire core is removed from the nesting position and inserted into an oven whereby the solder melts to secure the fins and tubes together. It is usually necessary to add additional solder to seal the tubes 18 in the perforations of the top and bottom walls 34 and 36. In the embodiments of FIGS. 1 through 5 the fins are in tight engagement with the tubes so that no relative movement occurs when the core is removed from the nesting position to the baking oven to melt the solder to secure the components together. In the embodiment of FIG. 8 the fins and tubes along with the perforated walls are bound together as by straps extending thereabout so as to prevent relative movement while being moved from the nesting position to the baking oven for soldering the components together.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method of making a heat exchanger assembly of the type having a core with front and rear faces with a plurality of tubes parallel to the faces and a plurality of fins extending transversely to the faces and tubes respectively and interconnecting the tubes, comprising the steps of; assembling the fins and tubes together and with a peripheral wall extending between the front and rear faces to define oppositely facing openings adjacent the faces and including perforated top and bottom walls interconnected by side walls inserting a first group of tubes through the perforations in the top and bottom walls so as to extend between the top and bottom walls, removing the lengths of the first group of tubes extending between the top and bottom walls, and closing the oppositely facing openings of the peripheral wall with closure members.

2. A method as set forth in claim 1 further defined as preforming a tubular opening in each of the closure members before closing the oppositely facing openings with the closure members.

3. A method as set forth in claim 2 further defined as forming the tubular openings so as to be in spaced relationship to the peripheral walls.

4. A method as set forth in claim 3 including inserting a tubular member into the tubular openings to extend between the closure members for allowing access through the core between the opposite faces thereof.

5. A method as set forth in claim 4 further defined as sealing the first group of tubes in each perforation in the top and bottom walls, sealing the closure members to the edges of the peripheral wall, and sealing the tubular member within each tubular opening in the closure members.

6. A method as set forth in claim 5 further defined as sealing by soldering.

7. A method as set forth in claim 6 further defined as soldering the tube and fins together.

8. A method as set forth in claim 4 wherein the assembling is further defined as comprising the steps of; disposing fin nesting members a distance apart approximately the distance between the front and rear faces of the core, positioning the peripheral wall between the fin nesting members to be supported thereby with the edges of the top and bottom and side walls thereof defining the oppositely facing openings facing the respective fin nesting members, positioning perforated fins in parallel spaced relationship between the nesting members with a first plurality of fins extending between the nesting members and across the top and bottom walls and laterally of the side walls and with a second plurality of fins extending between the nesting members in perpendicular relationship to and laterally of the side walls with the ends of the second plurality of fins disposed adjacent the side walls, and inserting the first group of parallel and spaced tubes through perforations in the first plurality of fins between the side walls and into perforations in the top and bottom walls, and inserting a second group of parallel and spaced tubes through perforations in the first and second plurality of fins laterally of the side walls and parallel thereto.

9. A method of making a heat exchanger assembly of the type having a core with front and rear faces with a plurality of fins extending transversely to the faces and tubes respectively and interconnecting the tubes comprising the steps of; providing tube nesting members each having a notch extending along the longitudinal axis of said tube nesting member, arranging said tube nesting members so that said notches are oriented vertically and disposing said tube nesting members a horizontal distance apart approximately the distance between the top and bottom of the core, disposing a first group of vertically spaced horizontal tubes between the tube nesting members and within the notches, disposing horizontal lengths of serpentine fin extending between the tube nesting members and engaging adjacently spaced rows of tubes, disposing a peripheral wall extending between the front and rear faces of the core to define oppositely facing openings adjacent the faces and including perforated top and bottom walls interconnected by side walls between the tube nesting members, disposing a second group of tubes to extend between and within each nesting member and the perforations in one of the top and bottom walls, closing the oppositely facing openings of the peripheral wall with closure members, removing the tube nesting members, and securing the tubes, fins and peripheral wall together to form the heat exchanger.

10. A method as set forth in claim 9 wherein said second group of tubes terminate within the top and bottom walls respectively adjacent the perforations therein so that the peripheral wall is devoid of tubes between the top and bottom walls thereof.

* * * * *